United States Patent [19]

Sawyer et al.

[11] Patent Number: 4,536,145

[45] Date of Patent: Aug. 20, 1985

[54] APPARATUS FOR FORMING AN EXPANDED FOAM FORM LINER INCLUDING A CONTOURED SURFACE

[75] Inventors: Robert D. Sawyer, Caledonia; Michael W. Fohl, Brookfield, both of Wis.

[73] Assignee: Tom Sawyer Supply & Equipment, Caledonia, Wis.

[21] Appl. No.: 607,516

[22] Filed: May 7, 1984

[51] Int. Cl.$^{3}$ .............................................. B29C 17/00

[52] U.S. Cl. ..................................................... 425/289

[58] Field of Search ................................ 425/289, 295

[56] References Cited

U.S. PATENT DOCUMENTS

| | | | |
|---|---|---|---|
| 693,760 | 2/1902 | Walker | 425/289 |
| 734,124 | 7/1903 | Frey | 425/289 |
| 752,464 | 2/1904 | Murphy | 425/289 |
| 3,734,991 | 5/1973 | Vrijma | 425/289 X |

*Primary Examiner*—J. Howard Flint, Jr.

[57] ABSTRACT

An apparatus for use in cutting a contoured surface in the face of a polystyrene foam block for use in casting concrete, wherein the contoured surface will form the mold surface. The apparatus comprises means for supporting a block of polystyrene foam material, a generally rigid wire having opposite ends, and means for heating the helical wire such that the wire can cut through the polystyrene foam block. The apparatus also comprises means for supporting the heated wire for controlled vertical and horizontal movement with respect to the polystyrene foam block, and with respect to a reference position.

20 Claims, 9 Drawing Figures

Fig. 2
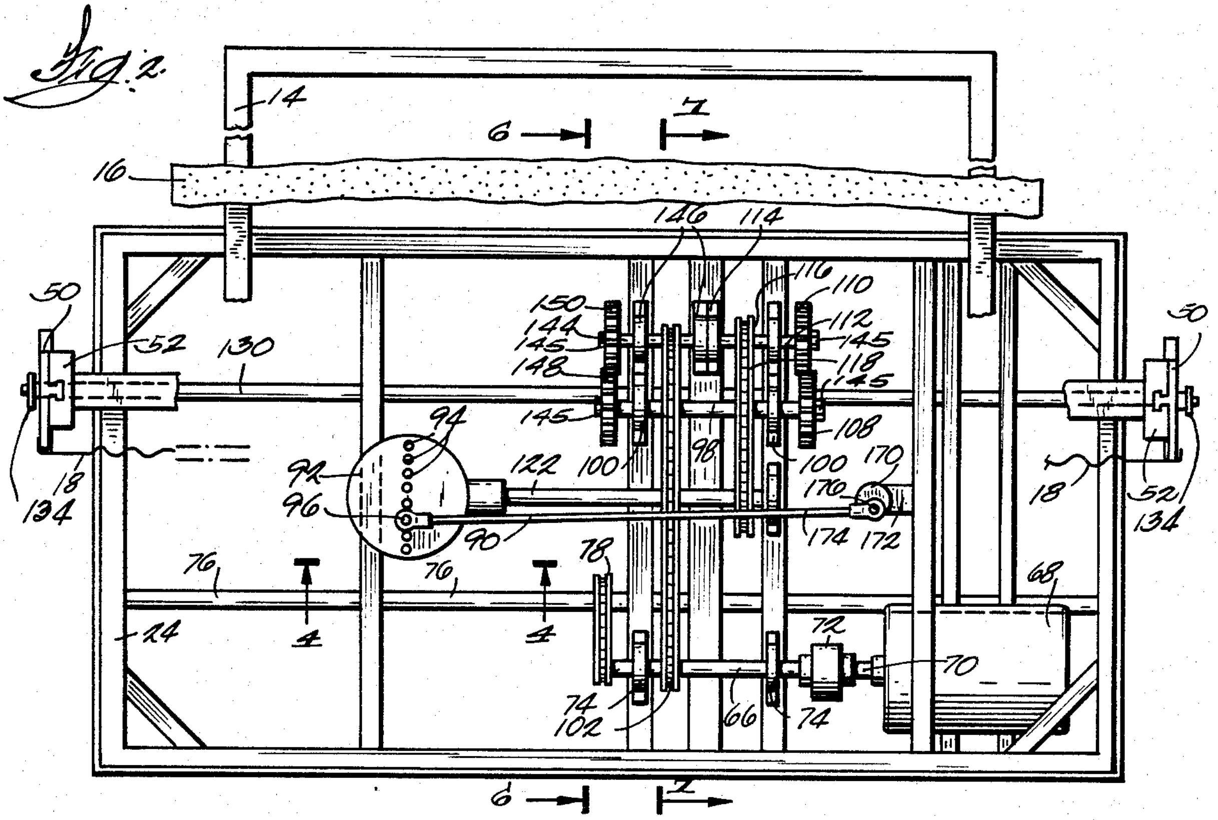
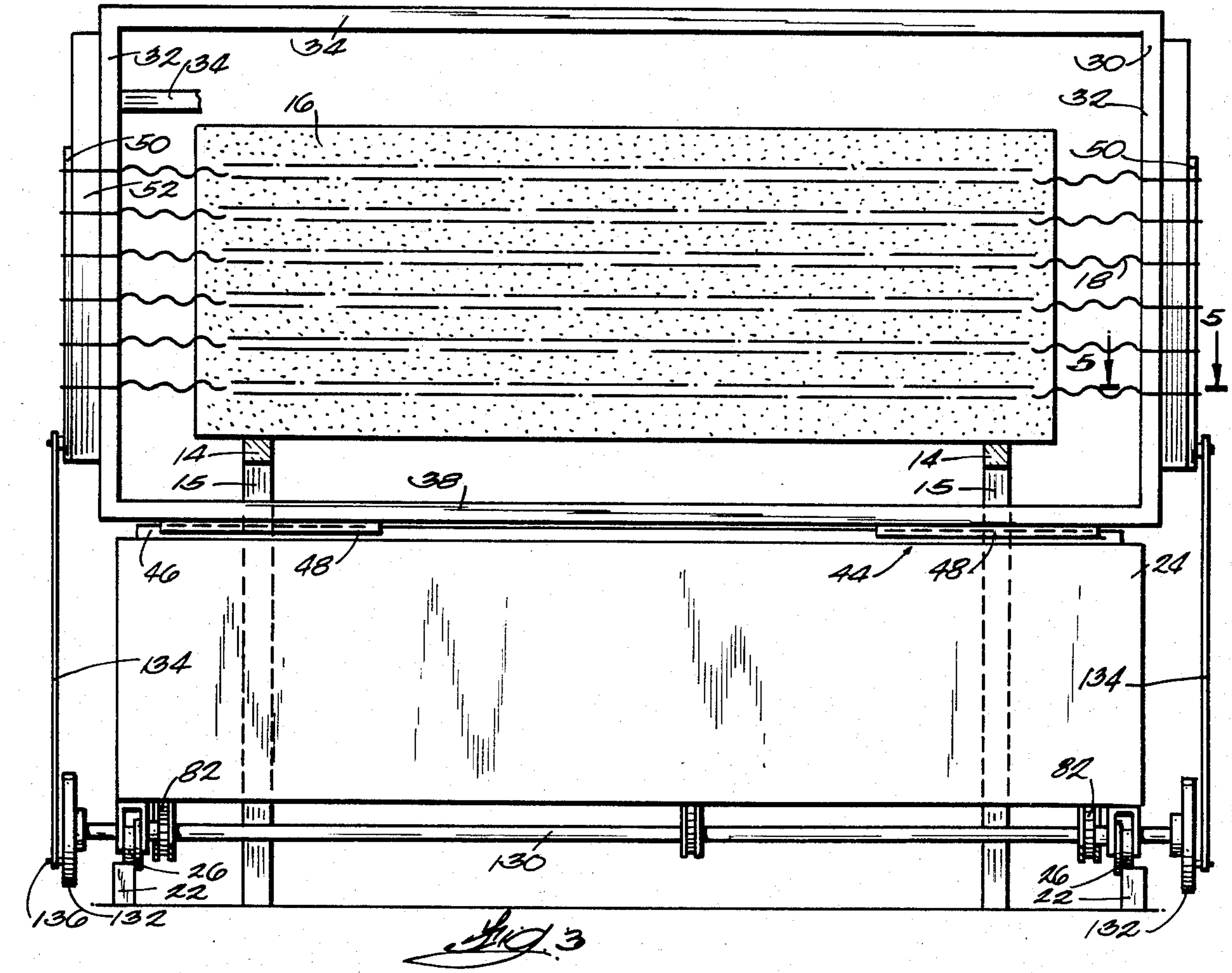
Fig. 3

APPARATUS FOR FORMING AN EXPANDED FOAM FORM LINER INCLUDING A CONTOURED SURFACE

FIELD OF THE INVENTION

The invention relates to the production of concrete molding forms, and more particularly to the manufacture of expanded foam form liners including a design cut into the molding surfaces of the form liners.

BACKGROUND OF THE INVENTION

Prior art methods for use in making forms of the type used in casting concrete have employed the use of expanded polystyrene foam slabs or blocks with a decorative configuration cut into the surface of the foam slab. During the casting of the concrete, the decorative configuration will be formed in the surface of the cast concrete. The prior art apparatus for use in forming such decorative configurations has included machines having an elongated heated electrically conductive wire and means for pulling this wire through a block of polystyrene foam to form a patterned or contoured surface in the foam. The heated wires may also be bent so as to cut a contoured surface pattern as the wire is moved through the foam block. The contoured surface is formed by moving the bent wire in three dimensions and by controlling the rate of movement of the wire through the block. Such an apparatus is illustrated in a brochure titled "Concrete Renaissance Through Building Technology". 1982, Down To Earth Bookshop Press, Perth, W. Australia, pages IX–X.

Attention is also directed to the Ritter U.S. Pat. No. 3,965,233, issued June 22, 1976. That patent relates to a method for producing a cast concrete article employing an expanded polystyrene foam form liner having a face which is textured or patterned to produce a complementary pattern in the surface of the molded product. The Ritter patent suggests the formation of a contoured surface on the face of the foam portion of the mold using electrically heated printing tools. The printing tools include an electrical element fixed to a frame or handle, and this electrical element is shaped so as to form a geometric impression on the foam. The patent also teaches a printing tool comprising an elongated support member supporting a wire forming a plurality of U-shaped loops. The loops are moved along the face of the form to produce a grooved pattern.

SUMMARY OF THE INVENTION

The present invention provides an improved apparatus for cutting or forming a decorative configuration in the surface of a foam block or slab. The invention provides an apparatus for use in cutting a contoured surface in the face of a polystyrene foam block and for thereby producing form liners for use in casting concrete or for use in other applications such as in producing expanded foam coiling tiles or exterior building insulation including a decorative surface pattern. The apparatus comprises a means for supporting a block of polystyrene foam material. The apparatus also includes at least one generally rigid wire having opposite ends, the wire including a plurality of bends and being connected to a voltage source such that current can flow through the wire for heating the wire to a temperature sufficient that the wire can cut through the polystyrene foam. The apparatus also comprises an improved means for supporting the heated wire for movement through the polystyrene foam block. The means for supporting the wire includes a means for causing generally horizontal movement of the wire through the block in a direction transverse to the longitudinal axis of the wire, means for causing generally horizontal reciprocal movement of the wire along the longitudinal axis of the wire, and means for causing generally vertical reciprocal movement of the wire. This apparatus permits the formation of a wide array of attractive surface configurations to be cut in the foam. The surfaces being formed can be varied widely by changing the rate of vertical movement or the amplitude of the vertical movement of the wire with respect to the rate of lateral movement, and by changing the rate of reciprocation and the amplitude of the horizontal lateral movement of the wire in the direction of its longitudinal axis. By changing these variables, a wide array of attractive surface patterns can be formed in the surface of the foam form liner.

The means for supporting the wire includes a carriage supported by a pair of spaced apart tracks, the tracks supporting the carriage for linear reciprocal movement along the length of the foam block being cut by the heated wire. Means are also provided for driving the carriage along the length of the tracks. In a preferred embodiment of the invention, a pair of chains extend along the tracks. The carriage includes a drive shaft having opposite ends, one end supporting a first sprocket and an opposite end supporting a second sprocket, the sprockets engaging the chains fixed to the tracks such that rotation of the drive shaft causes the carriage to be driven along the tracks.

In a preferred form of the invention, the wires are supported by a vertically extending frame in turn supported by the carriage. The frame is supported such that it is reciprocably moveable horizontally and in a direction perpendicular to the direction of movement of the carriage. The wires are also supported for vertical movement with respect to the frame and the carriage. In a preferred form of the invention, means are also provided for causing controlled horizontal reciprocal movement of the frame and vertical movement of the wires. These means are coupled to the carriage drive shaft such that the horizontal and vertical position of the wires is directly dependent and directly linked to the carriage drive mechanism. Accordingly, the horizontal position of the wires with respect to the carriage and the vertical position of the wires with respect to the carriage will be directly dependent upon the position of the carriage.

Another feature of the apparatus of the invention is that means are provided for driving the horizontally reciprocable frame and the vertically moveable wires such that the lateral and vertical positions of the wires are dependent upon the position of the carriage and are directly dependent upon the distance that the carriage has moved with respect to a reference point. Accordingly, the horizontal and vertical position of the wires will always be the same at the reference point.

Another advantage of the invention is that the means for driving the frame and the vertical movement of the wires includes machine gear combinations. By varying the machine gears employed, the speed and range of movement of the wires can be altered to produce a wide variety of patterns or configruations in the foam surface. These machine gears can be easily interchanged with a minimum of effort and without employment of a skilled craftsman.

Various other features and advantages of the invention will be apparent by reference to the following description of a preferred embodiment, from the claims and from the drawings.

BRIEF DESCRIPTION OF THE DRAWINGS

FIG. 3 is an end elevation view of the apparatus illustrated in FIG. 2.

FIG. 9 is an enlarged exploded perspective view of apparatus illustrated in FIG. 2.

Figure 1:
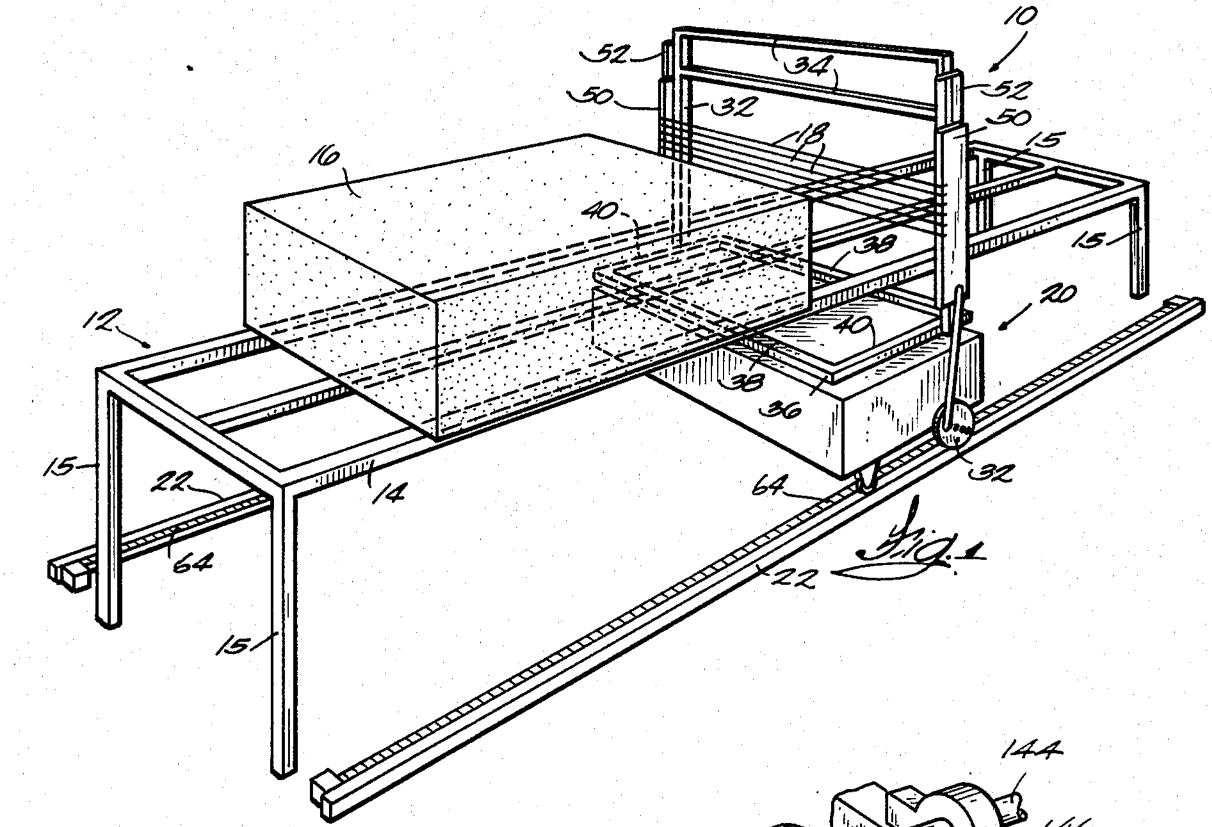
FIG. 1 is a perspective view of an apparatus embodying the present invention.

Before describing a preferred embodiment of the invention in detail, it is to be understood that the invention is not limited in its application to the details of construction and to the arrangement set forth in the following description nor illustrated in the drawings. The invention is capable of further embodiments and of being practiced and carried out in various ways. Also, it is to be understood that the phraseology and terminology employed herein is for the purpose of description and should be not regarded as limiting.

DESCRIPTION OF A PREFFERRED EMBODIMENT

Illustrated in FIG. 1 is a machine 10 embodying the present invention and for use in producing a decorative surface configuration in a block of expanded polystyrene foam. In one preferred form of the invention, the machine 10 can be used to produce concrete form liners, the form liners each including a decorative surface configuration such that when the concrete is cast against the foam form liners a decorative pattern is formed in the surface of the cast concrete.

More specifically, the machine 10 illustrated in FIG. 1 includes a table or support frame 12 having an elongated deck 14 supported at its opposite ends by legs 15 and adapted to support a block 16 of expanded polystyrene foam. The machine 10 also includes one or more wires 18 extending horizontally and supported for movement through the block 16 of expanded polystyrene foam. The wires 18 are connected to a voltage source (not shown) such that sufficient current will flow through the wires 18 that the wires 18 will be heated to a temperature wherein they will melt the foam polystyrene material. The wires 18 are supported for movement such that they will cut through the block 16 of expanded polystyrene foam to form layers of foam which can be used as form liners. As the wires 18 cut through the foam block 16, the wires 18 also produce a decorative configuration on the surface of the foam. More specifically, the means for supporting the wires 18 includes a carriage assembly 20 adapted to carry the wires 18 and to move horizontally from one end of the table or support frame 12 to an opposite end of the table and to move the wires through the foam block 16 supported on the table 12.

In a preferred form of the invention the wires supported by the carriage 20 will be bent or include an irregular configuration such that as they are moved through the foam block they will form a pattern in the cut surface of the foam block. Means are also provided for supporting the wires 18 for lateral reciprocal movement as the wires move through the block, this lateral reciprocal movement being in the direction of the longitudinal axes of the wires and laterally with respect to the direction of movement of the carriage 20. Means are also provided for causing vertical reciprocal movement of the wires as the wires cut through the block.

In a preferred form of the invention, the carriage 20 is supported by a pair of tracks 22 which are positioned on opposite sides of the table 12 and adapted to support the carriage 20 for movement along the length of the table.

The carriage 20 includes a frame 24 comprising an open, rectangular box construction adapted to be positioned on the tracks 22 so as to be moveable along the length of the tracks and is also positionable beneath the deck 14 of the table 12 and is intended to be moveable along the length of the table 12 beneath the deck 14. In the illustrated construction the carriage 20 comprises a rectangular flat box-like housing spanning the tracks 22 and supported at its opposite ends by wheels 26 which are in turn supported in the rails or tracks 22. The carriage 20 is positionable beneath the deck 12 and with the opposite ends of the carriage 20 extending laterally outwardly with respect to the sides of the table 12. The deck 14 is supported by legs 15 only at its opposite ends such that the supporting structure for the deck 14 does not interfere with movement of the carriage 20 along the entire length of the table and the tracks.

The means for supporting the wires 18 also includes a generally vertically extending frame 30 supported by the carriage 20 for movement with the carriage. Means are also provided for supporting the vertically extending frame 30 for horizontal reciprocal movement with respect to the carriage and in a direction perpendicular to the direction of movement of the carriage 20 along the tracks 22.

Referring more particularly to the construction of the vertically extending frame 30, it includes a pair of spaced apart vertical supports 32 having upper ends rigidly joined together in spaced apart relation by a pair of horizontally extending cross bars 34. The lower ends of the spaced apart vertical supports 32 are supported by a horizontal rectangular frame 36 comprised of a pair of elongated side bars 38 and a pair of end bars 40. The lower ends of the spaced apart vertical supports 32 are welded or otherwise rigidly joined to central portions of the end bars 40. The horizontal rectangular frame 24 supports the vertical supports 32 in sufficiently spaced apart relation that the vertical supports are positioned on opposite sides of the deck 14 as seen in FIG. 3 and can pass along the opposite sides of a foam block 16 supported on the deck 14 when the carriage 20 moves beneath the table or deck 14 and along the length of the tracks 22.

Means are also provided for supporting the horizontally extending frame structure 30 for horizontal reciprocal movement back and forth with respect to the carriage 20 and in a direction perpendicular to the direction of movement of the carriage. While various means could be provided for supporting the frame 30 for such horizontal reciprocal movement, in the illustrated arrangement each of the elongated frame members 38 are supported by a pair of conventional ball bearing drawer slides 44 (FIG. 3). More specifically, a pair of drawer slide tracks 46 are fixed to the upper portion of the carriage 20, complementary tracks 48 are secured to the lower surfaces of the elongated frame members 38, and ball bearings are housed between the tracks 46 and 48 such that the tracks are supported for smooth linear reciprocal movement with respect to each other.

Figure 5:
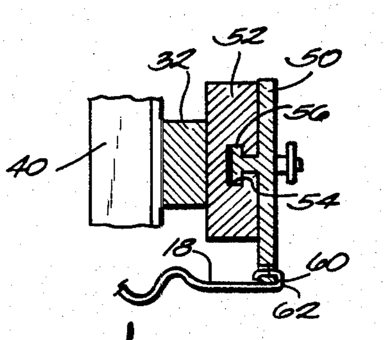
FIG. 5 is a section view taken along line 5—5 in FIG. 3.
Figure 6:
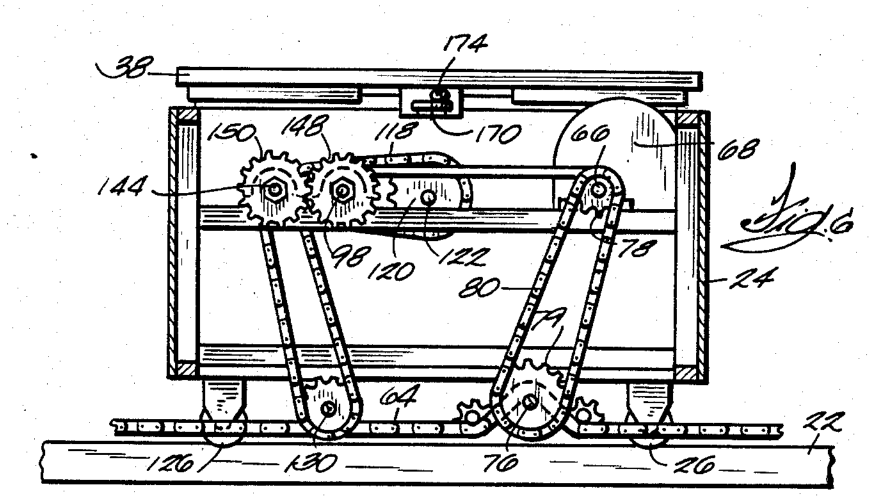
FIG. 6 is a cross section view taken along line 6—6 in FIG. 2.

Means are further provided for supporting the wires 18 for vertical reciprocal movement with respect to the foam block 16 as the carriage moves along the length of the table 12. In the illustrated construction, the means for supporting the wires for vertical movement includes a pair of vertically extending elongated sliding members 50 supported for vertical reciprocal sliding movement with respect to the vertical members 32. The sliding members 50 are supported for vertical slideable movement by a pair of vertically extending tracks 52 fixed to the outward surfaces of the vertical members 32. In the particular arrangement of the invention shown in the drawings the vertical tracks 52 are each comprised of an electrically conductive metal such as aluminum, and comprise an elongated relatively flat metal bar. The vertical sliding members 50 are similarly comprised of elongated flat metal plates. Means are also provided for joining the vertical tracks 52 and the vertical sliding members 50 for relatively free vertical slideable movement with respect to one another. In the illustrated construction, this means includes a T-shaped groove 54 (FIGS. 2 and 5) formed in the face of the vertical tracks 52 and extending along their length. The means for joining the tracks 52 and sliding members 50 also includes a means for electrically insulating the sliding members 50 from the tracks 52. In the illustrated construction nylon pads are sandwiched between the sliding members 50 and 52 to provide an electrically insulating layer therebetween. Each elongated slide member 50 includes a T-shaped member 56 fixed to the slide member 50 and housed in the groove 54 for vertical slideable movement. In the illustrated construction the T-shape member can be comprised of nylon to provide for relatively free sliding movement in the groove. The slide members 50 also each include a forward or leading edge having a plurality of small closely spaced holes 60 extending along the edge and adapted to house the ends of the wires 18. As illustrated in FIG. 5 the opposite ends of each of the wires 18 include a hook portion 62 adapted to extend through the holes 60 provided in the leading edges of the slide members 50 and such that the wires 18 will be firmly secured to the slide members 50 and will also be in electrical contact with the slide members. An electrical wire is connected to each of slide members so as to connect the wires 18 to a voltage source.

In a preferred form of the invention the wires are comprised of a relatively stiff or hard wire such that the bend or hook 62 formed in the end of the wires 18 will firmly engage the slide members 50. While various types of wire could be used, in one form of the invention, the wires are hard drawn stainless steel having a diameter of approximately 0.20 to 0.40 inches. Such a wire will also have sufficient stiffness that the wire can cut through the foam block without appreciable deformation of the bends in the wire.

Means are also provided for causing horizontal translational movement of the carriage 20 and the wires 18 along the length of the tracks 22 so that the heated wires 18 can cut through the foam block 16. In one preferred form of the invention, a chain 64 extends along the length of each track 22. One end of the chain 64 is fixed to one end of the track 22 and an opposite end of the chain 64 is fixed to an opposite end of the track 22. In a preferred form of the invention the carriage 20 includes a drive shaft 66 having opposite ends and an electric motor 68 is provided for rotationally driving the drive shaft 66 at a predetermined constant speed. The drive motor 68 is carried by the carriage 20 and is operably connected through a conventional gear reducer, which is an integral part of the motor 68, to an output shaft 70 in turn connected through a slip clutch 72 to the shaft 66. In one embodiment of the invention the drive motor can be a $\frac{1}{4}$ h.p. motor including a 288 to 1 gear reduction. The shaft 66 is rotatably supported by a pair of conventional bearings 74 and is drivingly connection to a carriage drive shaft 76 by a pair of sprockets 78 and 79 and a carriage drive chain 80. In one form of the invention the sprockets 78 and 79 are constructed to produce a $3\frac{1}{2}$ to 1 speed reduction from the shaft 66 to the drive shaft 76.

Figure 8:
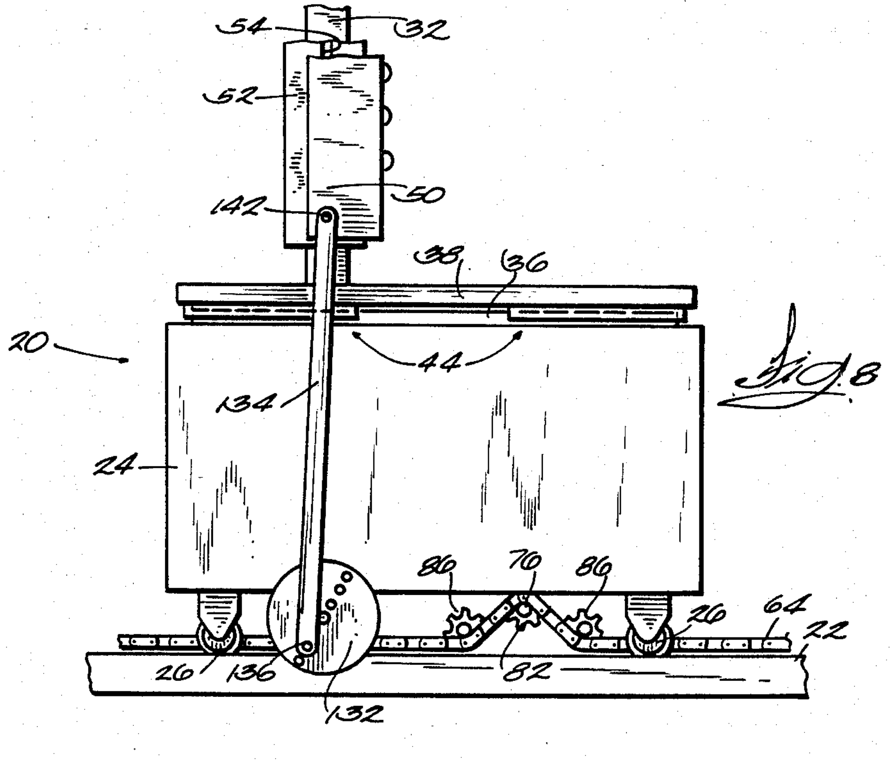
FIG. 8 is a view taken along line 8—8 in FIG. 2.

The opposite ends of the carriage drive shaft 76 support a pair sprockets 82, and the chains 64 are reeved over the sprockets 82 in the manner illustrated in FIG. 8. Pairs of idler sprockets 86 are also provided to maintain engagement of the chains 64 with the sprockets 82 of the carriage drive shaft 76. It will be appreciated that rotation of the drive shaft 76 will cause the sprockets 82 and the carriage 20 to traverse the length of the chains 64 at a controlled rate. While a sprocket and chain drive arrangement has been illustrated, in other applications this drive arrangement could be replaced by a rack and pinion drive or other means for providing a positive engagement between the drive shaft and the tracks.

Means are also provided for causing lateral reciprocal movement of the frame 30 and the wires 18 with respect to the carriage 20 and the foam block 16 and in a horizontal direction perpendicular to the direction of movement of the carriage. In the illustrated arrangement this means includes a push rod 90 (FIG. 2) having one end connected to the frame 30, and the opposite end is connected to the means supported by the carriage and for causing reciprocal movement of the push rod 90. This means for causing reciprocal movement of the push rod 90 includes a circular disc 92 lying in a generally horizontal plane and supported for rotation about a vertical axis. The disc 92 includes a plurality of holes or bores 94 therethrough, the holes 94 being spaced apart across the diameter of the circular disc 92 and extending through the disc 92 in the direction of the axis of the disc. An end of the push rod 90 is connected by a pin 96 to the disc 92 with the pin 96 being housed in a selected one of the holes 94. The holes are spaced at various distances from the axis of the disc 92, and rotation of the disc 92 will cause reciprocation of the push rod 90. By moving the pin 96 to other holes 94 in the disc, the amplitude of the stroke of the push rod 90 can be varied. This change in the amplitude of the stroke of the push rod 90 will result in variation in the amount of lateral movement of the vertical frame 30 and wires 18 with respect to the carriage 20.

Figure 2:
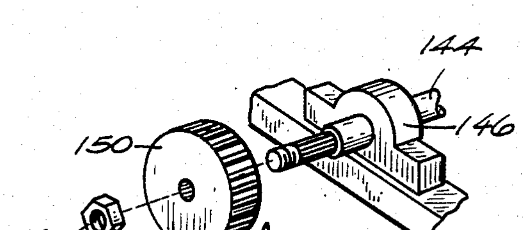
FIG. 2 is a plan view of the carriage of the apparatus illustrated in FIG. 1 and with portions cut away.
Figure 4:
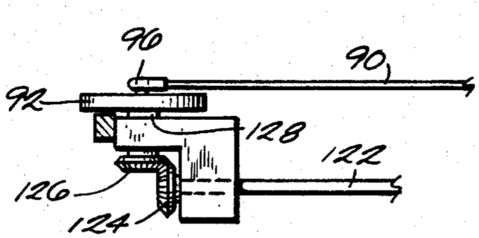
FIG. 4 is a section view taken along line 4 in FIG. 2.
Figure 7:
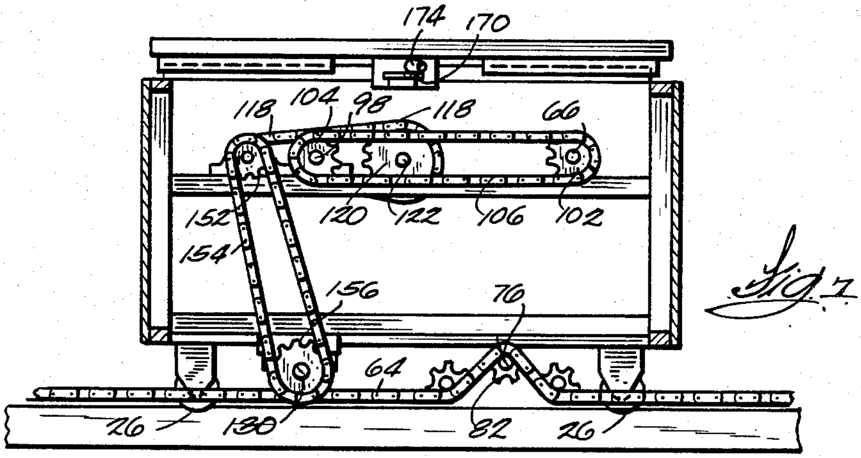
FIG. 7 is a cross section view taken along line 7—7 in FIG. 2.

Means are also provided for operably connecting the rotating disc 92 to the drive shaft 66 and to the carriage drive shaft 76 to cause rotation of the disc 92 in response to rotation of the carriage drive shaft 76 and movement of the carriage 20 along the tracks 22. This means includes a driven shaft 98 supported by a pair of bearings 100. A first sprocket 102 (FIG. 7) is fixed to the drive shaft 66, and a driven sprocket 104 is fixed to the driven shaft 98. A chain 106 drivingly connects the drive sprocket 102 and the driven sprocket 104. The driven shaft 98 is connected by a first pair of meshing gears 108 and 110 to a third shaft 112. The third shaft 112 is supported by a pair of bearings 114 and supports a sprocket 116. A chain 118 drivingly connects the sprocket 116 on the third shaft 112 to a sprocket 120 on a driven shaft 122. As best shown in FIGS. 2 and 4, the shaft 112 extends horizontally and includes an end supporting a bevelled gear 124 which in turn drives a driven bevelled gear 126. The second or driven bevelled gear 126 drives a vertically extending shaft 128 supporting the horizontal disc 92.

Means are also provided for causing vertical reciprocal movement of the slide members 50 in response to movement of the carriage 20 along the tracks 22 and in unison with the lateral reciprocal movement of the vertically extending frame 30. In the illustrated construction this means includes a horizontal shaft 130 extending beneath the carriage 20 and having opposite ends extending outwardly beyond the sides of the carriage 20. The opposite ends of the shaft each support circular discs 132. A pair of vertically extending push rods 134 are also provided, the push rods 134 joining the discs 132 to the vertically moveable slides 50. The lower ends of the push rods 134 are connected by pins 136 to the discs 132 in spaced apart relation from the axes of rotation of the discs 132. The discs 132 each include a plurality of holes or bores 140 (FIG. 8), the holes or bores 140 being spaced outwardly from the axis of rotation of the discs 132. The uper ends of the vertically extending push rods 134 are pivotally connected by pins 142 to the vertically moveable slide members 50. Rotation of the discs 132 will thus cause vertical reciprocal movement of the slides 50 with respect to the vertical supporting members 32. Such simultaneous vertical movement of the slides 50 will cause a complementary vertical movement of the wires 18 stretched between the slide members 50.

Means are also provided for causing rotation of the shaft 130 which drives the discs 132. In the illustrated construction this means includes a shaft 144 supported by a pair of bearings 146 and drivingly connected to the shaft 98 by a pair of machine gears 148 and 150. As previously stated, the shaft 98 is driven by a chain 106 and the drive shaft 66. The shaft 144 also supports a sprocket 152 (FIG. 7) and a chain 154 extends from that sprocket 152 to a sprocket 156 on the driven shaft 130.

One of the features of the present invention is that each of the driven shafts 130, 76 and 122 is positively connected to the drive shaft 66, and the means for causing horizontal movement of the wires 18 and the means for causing vertical reciprocal movement of the wires 18 are positively connected to the structure for causing translation of the carriage 20 along the tracks. During operation of the apparatus of the invention, the carriage 20 will be returned to a reference position at one end of the tracks 22. Since the means for causing horizontal movement of the wires and vertical movement of the wires is directly connected to the carriage drive means, when the carriage is returned to the zero reference position, the horizontal reciprocal drive means and the vertical reciprocal drive means are similarly in a zero reference position. Additionally, since a positive drive means is provided for connecting each of these functions, at any specified position of the carriage 20 on the tracks, the wires 18 will be in a predetermined vertical and horizontal position, and the wires will consistenly cut the same pattern in the polystyrene foam block.

Another feature of the illustrated structure is that means are provided for positively driving both sides of the carriage 20 such that the carriage will not become skewed on the tracks 22 as it moves from one end of the tracks to the other.

In a preferred form of the invention means are also provided for causing the vertically extending frame 30 to hesitate as it reaches the end of its lateral stroke and before it moves in the opposite direction. Hesitation of the frame 30 provides another variation in the pattern which can be produced by the wires 18 as they cut through the foam block 16. In the illustrated arrangement the means for causing hesitation in the lateral movement of the frame 30 includes a disc 170 joining the end of the push rod 90 to the frame 30. The disc 170 is pivotally joined to the frame 30 by a bracket 172 so as to be freely rotatable about a central vertical axis. The disc 172 includes at least one aperture spaced outwardly from the axis of rotation of the disc 170. The end 174 of the push rod 90 is pivotally connected to the disc 170 by a vertial pin 176 extending through the push rod 90 and housed in the aperture in the disc 170 such that the end 174 of the push rod is freely rotatable with respect to the disc 170. It should be understood that in other arrangements the disc 170 could be replaced by a lever arm supported for pivotal movement and for pivotally connecting the end of the push rod 90 to the frame 30.

One of the advantages of the illustrated construction is that the machine gears 108 and 110 and machine gears 148 and 150 can be varied so as to provide for variation in the speed of rotation of the driven shafts 122 and 130. In the illustrated arrangement machine gears 108 and 110 are of equal size and include an equal number of gear teeth so as to provide a one-to-one driving relation between the drive shaft 98 and the driven shaft 112. Means are also provided for supporting the machine gears on the ends of shafts 98 and 112, respectively, such that these gears 108 and 110 can be easily removed and replaced with similar gears providing a gear redcution or increase, and thereby varying the speed of rotation of the driven shaft 112. Variation in the speed of the shaft 112 varies the speed of the lateral reciprocation of the frame 30 with respect to the speed of movement of the carriage 20 along the tracks. Additionally the positions of each pair of gears can be reversed to provide alternative speeds. While in the illustrated construction, the machine gears 148 and 150 also have an equal number of teeth, other machine gears can be easily substituted for these gears so that the shaft 130 can be driven at different speeds with respect to movement of the carriage 20 along the tracks and with respect to the speed of lateral movement of hte frame 30. While various means could be provided for supporting the gears 108, 110, 148 and 165, in one embodiment, the end portions of the shafts supporting these gears can be splined and the extending ends of the shafts can be threaded so as to support a nut thereon.

While in the arrangement described above the drive means for causing horizontal movement of the carriage along the tracks is driven at one speed, in other constructions a variable speed drive means could be provided. This drive means could include a variable speed drive motor, or alternate drive sprockets could be provided.

Additionally, while the apparatus described above, is referred to as being for use in making forms used in casting concrete it should be understood that the apparatus could useful in a variety of other applications such as in the production of foam ceiling tile including a decorative surface configuration, or in the production of expanded foam exterior insulation for buildings and including a decorative exterior surface configuration.

Various features of the invention are set forth in the following claims:

We claim:

1. Apparatus for use in forming a decorative surface configuration in a block of expanded polystyrene foam, the apparatus comprising:

support means for supporting a block of expanded polystyrene foam, a wire having opposite ends and being adapted to be connected to a voltage source whereby electrical current flowing throught the wire will heat the wire to a temperature higher than the melting temperature of the polystyrene foam, means for supporting the wire in generally linear relation, said means for supporting the wire including means for causing movement of the wire through the expanded foam block to cut a decorative surface configuration in the block, the means for causing movement including a carriage supported for linear reciprocal movement along the length of the block of expanded polystyrene foam between a retracted position and an extended position, means for causing movement of the carriage along the length of the block, and means for causing movement of the wire including means for causing lateral reciprocal movement of the wire in the direction of the longitudinal axis of the wire as the wire moves from the retracted position to the extended position, and means for causing vertical reciprocal movement of the wire as the wire moves from the extended position to the retracted position, the means for causing reciprocal movement of wire in the direction of the longitudinal direction and the means for causing vertical reciprocal movement of the wire being connected to the means for causing movement of the carriage along the length of the block such that the vertical position of the wire and the lateral position of the wire are dependent on the position of the carriage with respect to the block.

2. Apparatus as set forth in claim 1 wherein said means for causing lateral reciprocal movement of the wire in the direction of the longitudinal axis of the wire includes a first driven shaft, and the means for causing vertical reciprocal mvoement of the wire includes a second driven shaft mechanically joined such that said first driven shaft and said second driven shaft are simultaneously driven.

3. Apparatus as set forth in claim 2 wherein the means for causing movement of the carriage includes a third driven shaft drivingly connected to said first driven shaft and said second driven shaft.

4. Apparatus as set forth in claim 3 and further including means for drivingly connecting said third driven shaft to said first driven shaft, said means for drivingly connecting including a first pair of meshing gears.

5. Apparatus as set forth in claim 4 wherein one of said gears are removably mounted on said third driven shaft and said first driven shaft.

6. Apparatus as set forth in claim 4 and further including means for drivingly connecting the second driven shaft to the first driven shaft and including a second pair of meshing gears.

7. Apparatus as set forth in claim 1 wherein said means for causing movement of the carriage along the length of the block includes at least one chain extending along the length of the block, a driven shaft rotatably supported by the carriage, the driven shaft including a longitudinal axis perpendicular to the direction of movement of the carriage, and a sprocket fixed to the driven shaft for rotation with the driven shaft and engaging the chain such that rotation of the sprocket causes the carriage to be driven along the length of the chain.

8. Apparatus as set forth in claim 1 wherein said means for causing movement of the carriage along the length of the block includes a pair of spaced apart chains, one of the chains positioned adjacent one side of the carriage and the other of the chains positioned adjacent an opposite side of the carriage, the chains being parallel and extending in the direction of movement of the carriage, a rotationally driven shaft including a longitudinal axis perpendicular to the chains, the driven shaft including opposite ends, a first sprocket fixed to one of the opposite ends and engaging one of the chains and a second sprocket fixed to the other opposite end of the driven shaft and engaging the other chain such that rotation of the driven shaft causes the carriage to be driven along the chains.

9. Apparatus as set forth in claim 1 wherein the means for supporting the wire includes a first vertically extending metal plate supporting one end of the wire, a second vertically extending metal plate supporting the opposite end of the wire, and means for supporting the vertically extending plates for vertical reciprocal movement, the means for supporting including a frame, means for supporting the frame for horizontal reciprocal movement with respect to the carriage, the frame including a pair of parallel spaced veritcally extending guides, one of the guides positioned on one side of the carriage and the other of the guides positioned at an opposite side of the carriage, the metal plates being supported by the guides for vertical reciprocal movement and the metal plates being adapted to be connected to a voltage source.

10. Apparatus for use in forming a decorative surface configuration in a block of expanded polystyrene foam, the apparatus comprising support means for supporting a block of expanded polystyrene foam, a wire having opposite ends and being adapted to be connected to a voltage source whereby electrical current flowing through the wire will heat the wire to a temperature higher than the melting temperature of the polystyrene foam.

means for supporting the wire in generally linear relation, said means for supporting the wire including means for causing movement of the wire through the expanded foam block to cut a decorative surface configuration in the block, the means for causing movement including a carriage supported for linear reciprocal movement along the length of the block of expanded polystyrene foam between a retracted position and an extended position, means for causing movement of the carriage along the length of the block, and the means for causing movement of the wire including means for causing lateral reciprocal movement of the wire in the direction of the longitudinal axis of the wire as the wire moves from the retracted position to the extended position, and means for causing vertical reciprocal movement of the wire as the wire moves from the extended position to the retracted position, said means for causing movement of the carriage including a pair of spaced apart elongated drive members, one of the elongated drive members positioned adjacent one side of the carriage and the other of the elongated drive members positioned adjacent an opposite side of the carriage, the elongated drive members being parallel and extending in the direction of movement of the carriage, a rotationally driven shaft including a longitudinal axis perpendicular to the elongated drive members, the driven shaft including opposite ends, a first engaging member fixed to one of the opposite ends and engaging one of the elongated drive members and a second engaging member fixed to the other of the opposite ends of the driven shaft and engaging the other of the elongated drive members such that rotation of the driven shaft causes the carriage to be driven along the length of the elongated drive members.

11. Apparatus as set forth in claim 10 wherein the elongated drive members are chains and wherein said engaging members are sprockets.

12. Apparatus as set forth in claim 10 wherein said means for causing lateral reciprocal movement of the wire in the direction of the longitudinal axis of the wire includes a second driven shaft and the means for causing vertical reciprocal movement of the wire includes a third driven shaft mechanically joined such that said second driven shaft and said third driven shaft are simultaneously driven.

13. Apparatus as set forth in claim 12 wherein the rotationally driven shaft is drivingly connected to the second driven shaft and to said third driven shaft.

14. Apparatus as set forth in claim 13 and further including means for drivingly connecting said rotationally driven shaft to said second driven shaft, said means for drivingly connecting including a first pair of meshing gears.

15. Apparatus as set forth in claim 14 wherein one of said gears are removably mounted on said rotationally drive shaft and said second driven shaft.

16. Apparatus as set forth in claim 13 and further including means for drivingly connecting the third driven shaft to the rotationally driven shaft and including a second pair of meshing gears.

17. Apparatus for use in forming a decorative surface configuration in a block of expanded polystyrene foam, the apparatus comprising:

support means for supporting a block of expanded polystyrene foam, a wire having opposite ends and being adapted to be connected to a voltage source whereby electrical current flowing through the wire will heat the wire to a temperature higher than the melting temperature of the polystyrene foam, means for supporting the wire in generally linear relation, said means for supporting the wire including means for causing movement of the wire through the expanded foam block to cut a decorative surface configuration in the block, the means for causing movement including a carriage supported for linear reciprocal movement along the length of the block of expanded polystyrene foam between a retracted position and an extended position, means for causing movement of the carriage along the length of the block, and the means for causing movement of the wire including means for causing lateral reciprocal movement of the wire in the direction of the longitudinal axis of the wire as the wire moves from the retracted position to the extended position, and means for causing vertical reciprocal movement of the wire as the wire moves from the extended position to the retracted position, said means for causing lateral reciprocal movement of the wire in the direction of the longitudinal axis of the wire including a first driven shaft, and the means for causing vertical reciprocal movement of the wire including a second driven shaft mechanically joined to the first driven shaft such that the first driven shaft and the second driven shaft are simultaneously driven, the means for causing movement of the carriage including a third driven shaft drivingly connected by a first pair of meshing gears to the first driven shaft, and the third driven shaft being drivingly connected to the second driven shaft by a second pair of meshing gears.

18. Apparatus as set forth in claim 17 wherein said gears are removably mounted on said shafts.

19. Apparatus as set forth in claim 17 wherein said means for causing movement of the carriage along the length of the block includes at least one chain extending along the length of the block, and wherein the third driven shaft is rotatably supported by the carriage, the third driven shaft including a longitudinal axis perpendicular to the direction of movement of the carriage, and a sprocket fixed to the third driven shaft for rotation with the third driven shaft and engaging the chain such that rotation of the sprocket causes the carriage to be driven along the length of the chain.

20. Apparatus as set forth in claim 17 wherein said means for causing movement of the carriage along the length of the block includes a pair of spaced apart chains, one of the chains positioned adjacent one side of the carriage and the other of the chains positioned adjacent an opposite side of the carriage, the chains being parallel and extending in the direction of movement of the carriage, and wherein the third driven shaft includes a longitudinal axis perpendicular to the chains and opposite ends, a first sprocket fixed to one of the opposite ends and engaging one of the chains and a second sprocket fixed to the other opposite end of the third driven shaft and engaging the other chain such that rotation of the third driven shaft causes the carriage to be driven along the chains.

* * * * *

UNITED STATES PATENT AND TRADEMARK OFFICE

CERTIFICATE OF CORRECTION

PATENT NO. : 4,536,145

DATED : August 20, 1985

INVENTOR(S) : Robert D. Sawyer et al.

It is certified that error appears in the above-identified patent and that said Letters Patent is hereby corrected as shown below:

Column 1, line 58, "coiling" should read -- ceiling --.

Column 10, line 38, "veritcally" should read -- vertically --.

Signed and Sealed this

*Seventeenth* Day of *December 1985*

[SEAL]

*Attest:*

DONALD J. QUIGG

*Attesting Officer* *Commissioner of Patents and Trademarks*